United States Patent [19]

Marcantonio

[11] Patent Number: 4,927,794

[45] Date of Patent: May 22, 1990

[54] LEACHING COBALT, MOLYBDENUM, NICKEL, AND VANADIUM FROM SPENT HYDROPROCESSING CATALYSTS

[75] Inventor: Paul J. Marcantonio, Novato, Calif.

[73] Assignee: Chevron Research Company, San Francisco, Calif.

[21] Appl. No.: 749,614

[22] Filed: Jun. 26, 1985

[51] Int. Cl.$^5$ ............................................. B01J 38/66
[52] U.S. Cl. ...................................... 502/26; 423/53; 423/68; 423/150
[58] Field of Search ............. 75/119, 103, 121, 101 R; 423/53, 54, 68, 150; 502/26

[56] References Cited

U.S. PATENT DOCUMENTS

| | | | |
|---|---|---|---|
| 2,204,193 | 6/1940 | Spicer et al. | 423/56 |
| 3,653,815 | 4/1972 | Skorbo | 423/56 |
| 4,080,421 | 3/1978 | Kasserra | 423/56 |
| 4,382,068 | 5/1983 | Rokukawa | 423/53 |

Primary Examiner—Robert L. Stoll
Attorney, Agent, or Firm—T. G. De Jonghe; P. L. McGarrigle, Jr.

[57] ABSTRACT

A process is disclosed to extract metal values selected from the group consisting of cobalt, molybdenum, nickel, tungsten, and vanadium from metal-containing particles, such as spent hydroprocessing catalyst particles containing carbon residue. In this process, the spent catalyst particles are roasted in an oxygen-containing gas at a temperature of from 400° C. to 600° C., and then the roasted catalyst particles are contacted with an aqueous solution of ammonia, ammonium salt, and hydrogen peroxide. That aqueous solution has an initial pH of at least 9.5 and an initial hydrogen peroxide concentration of from 0.02 to 0.2 M. That aqueous solution is maintained at a pH of greater than 9.5.

1 Claim, No Drawings

LEACHING COBALT, MOLYBDENUM, NICKEL, AND VANADIUM FROM SPENT HYDROPROCESSING CATALYSTS

BACKGROUND OF THE INVENTION

This invention relates to methods of leaching metals from metal-containing particles, such as spent hydroprocessing catalysts.

One modern development in crude oil processing is the upgrading of metal- and sulfur-containing feedstocks (e.g., crude oils and residua) by hydroprocessing methods. Such upgrading is necessary to convert the heavy feedstock into more valuable, lower boiling fractions and to remove metals and sulfur contaminants that can pollute the atmosphere upon combustion.

Crude oils contain various dissolved contaminants, including nickel, vanadium, iron, and sulfur. The lighter fractions are frequently distilled off under either atmospheric pressure or a partial vacuum, leaving the metals in a high boiling fraction called the "residua." Residua will generally contain at least 35 ppm metal contaminants, frequently as high as 100 ppm, and in extreme cases, higher than 1000 ppm.

These metals, and any sulfur present, are removed by processing the feedstock with a catalyst in the presence of hydrogen. Such catalysts are generally a solid support that contains catalytic metals, generally a Group VIII metal alone or in conjunction with a Group VI metal. The Group VI metal is typically tungsten or molybdenum and the Group VIII metal is typically nickel or cobalt. As the catalyst is used, metals from the feedstock deposit on its exterior surface and the interior surface of its pores, eventually plugging the pores and reducing the activity of the catalyst to such an extent it does not give the desired product quality. Such catalysts are herein defined as "spent catalysts," and contain catalytic metals, an inorganic support matrix, metals removed from the feedstock, sulfur compounds, and a hydrocarbonaceous residuum.

Recently, the obtainable crude oil is tending to be heavier, forcing refiners to use more hydroprocessing catalysts than heretofore necessary to remove metals and sulfur from the feedstock. It is therefore possible that a shortage will develop of the valuable catalytic metals, particularly cobalt. Efforts have been made to extract metals from hydroprocessing catalysts so that the catalytic metals, the deposited metals, and the catalyst supports can be reused.

One process of leaching hydroprocessing catalysts is disclosed in U.S. Pat. No. 3,567,433. An aqueous ammonia and ammonium salt leach solution is contacted with spent catalyst particles.

Another leaching process is disclosed in *Chemical Abstracts*, 94: 178649x. A spent catalyst, containing aluminum, vanadium, nickel, cobalt, and molybdenum, was leached with ammonia and ammonium salts, at a temperature greater than 110° C. and an oxygen partial pressure of greater than 1 kg/cm$^2$, for more than ½ hour. Such conditions require autoclave reactors.

U.S. Pat. No. 4,216,118 discloses chlorinating spent catalysts to convert vanadium values to vanadium tetrachloride and nickel values to nickel chloride for recovery by solvent extraction.

U.S. Pat. No. 4,145,397 discloses recovery of metals from spent catalysts by roasting at high temperatures and leaching with caustic alkali.

U.S. Pat. No. 4,432,949 discloses separating metal values from an aqueous stream containing vanadium, molybdenum, nickel, and cobalt. Vanadium is first precipitated, and then nickel, cobalt, and molybdenum are removed by serial ion exchange.

U.S. Pat. No. 4,434,141 discloses recovering metal values from an aqueous stream. The metal values are preferably obtained from leaching spent hydroprocessing catalysts, and include nickel, cobalt, vanadium, and molybdenum. The metal values are extracted, isolated, and purified by liquid, liquid extraction techniques.

An article in *Engineering and Mining Journal*, May 1978, page 105, describes a plant to process spent catalysts containing no cobalt by first leaching with sodium hydroxide and then with ammonium carbonate.

It would be advantageous if a method were found for leaching, simultaneously, cobalt and molybdenum, nickel, and vanadium from hydroprocessing catalysts with high yields of each metal value.

SUMMARY OF THE INVENTION

A method is provided for extracting metal values selected from the group consisting of cobalt, molybdenum, nickel, tungsten, and vanadium from metal-containing particles, such as spent hydroprocessing catalyst particles containing carbon residue. The particles are first roasted in an atmosphere containing molecular oxygen at a temperature in the range of between 400° C. and 600° C. The particles are then leached for at least 15 minutes with an aqueous solution containing ammonia, an ammonium salt, and hydrogen peroxide. That aqueous solution has an initial pH of at least 9.5 and an initial hydrogen peroxide concentration of from 0.02 to 0.2M. The pH of that aqueous solution is maintained at above 9.5. Preferably, the initial pH is at least 10.0, and more preferably, at least 10.4.

In one embodiment, the particles are first roasted in an atmosphere containing molecular oxygen at a temperature in the range of between 400° C. and 450° C. The particles are then leached for at least 15 minutes with an aqueous solution containing ammonia, an ammonium salt, and hydrogen peroxide at a temperature of from 50° C. to 95° C. That aqueous solution has an initial pH of at least 10.4, an initial hydrogen peroxide concentration of from 0.02 to 0.2M, an initial ammonia concentration of at least 2M, and an initial ammonium salt concentration of at least 0.5M. The pH of that aqueous solution is maintained at above 9.5. The roasting and contacting steps are repeated as needed to increase metals extraction.

DETAILED DESCRIPTION OF THE PREFERRED EMBODIMENTS OF THE INVENTION

The present invention can be used to recover metal values from metal-containing particles, such as laterite or spent catalyst particles.

Laterite is a red, porous deposit containing large amounts of aluminum and ferric hydroxides, formed by the decomposition of certain rocks. Laterite often contains such metal values as nickel and cobalt. One method of removing the metal values from laterite is by leaching the laterite with ammoniacal ammonium carbonate solutions, but cobalt extraction is incomplete by these methods. By adding hydrogen peroxide to the leaching solution, and by having the solution at a pH of at least 10.0, preferably 10.4, we are able to significantly increase cobalt extraction.

The spent catalyst particles, as they come from the catalytic reaction vessel, are highly contaminated with carbonaceous deposits and sulfur. These contaminants are easily removed by combustion in an atmosphere containing molecular oxygen, for example, air, but, if the roasting temperature is too high, the amount of metals leached from the catalyst particles (particularly cobalt, nickel, and vanadium) tends to suffer. Preferable conditions for reaction with oxygen are from 400° C. to 600° C., preferably from 400° C. to 450° C. One method of controlling temperature is by diluting the oxygen with nitrogen. The catalyst so treated is free from substantial carbonaceous and sulfide residue and the metals contained therein can be easily removed by an aqueous ammonia leach.

The preferable leach solution is an aqueous solution of $NH_3$(aq), hereinafter ammonia, $NH_4^+$(aq), hereinafter ammonium from a suitable ammonium salt, and hydrogen peroxide. Such a solution will be alkaline, which is preferred to solubilize vanadium and molybdenum, and will contain free ammonia, an effective complexing agent for nickel and cobalt. Ammonia/ammonium carbonate/hydrogen peroxide solutions are especially well suited as they allow reagent recycle by means of distillation of the pregnant liquor and reabsorbtion in fresh or recycle aqueous solution. Ammonium sulfate is another preferred ammonium salt for the practice of this invention. Nickel and cobalt will be free cations and form $M(NH_3)_x^{++}$ where x is 3 to 6, hereinafter amine complexes, and molybdenum and vanadium will be in the form of oxyanions and will form ammonium salts.

The catalyst support of the spent catalyst particles will frequently be alumina. However, mixtures of alumina with other refractory inorganic oxides, for example, silica, boria, magnesia and titania, as well as supports that contain naturally occurring alumina-containing clays, for example, kaolin or halloysite, may be leached by the process of this invention.

In the buffered system used herein, two factors must be adjusted for optimal extracton: the concentration of ammonia, and the pH of the leach solutions. The solution must contain sufficient ammonia to complex the nickel and cobalt present. The pH throughout the reaction should be not lower than 9.5. Preferably, the initial pH (which is defined as the pH of the solution prior to contacting with the catalyst particles) is at least 10.0, more preferable at least 10.4.

Hydrogen peroxide significantly increases cobalt and vanadium extraction. The initial hydrogen peroxide concentration (which is defined as the hydrogen peroxide concentration of the solution prior to contacting with the catalyst particles) should be in the range of from 0.02 to 0.2 molar (M).

The initial ammonia concentration (which is defined as the ammonia concentration of the solution prior to contacting with the catalyst particles) should be at least 2M. The initial ammonium salt concentration (which is defined as the ammonium salt concentration of the solution prior to contacting with the catalyst particles) should be at least 0.5M.

The roasting step and the contacting step can be repeated as often as necessary to increase metals extraction.

EXAMPLES

The invention will be further illustrated by the following examples which set forth particularly advantageous method embodiments. While the Examples are provided to illustrate the present invention, they are not intended to limit it.

A two-level factorial design experiment was run to determine the effect of hydrogen peroxide and pH on spent catalyst leaching. The roasted catalyst feed analyzed 1.7% Co, 8.3% Mo, 1.4% Ni, and 4.5% V. Hydrogen peroxide concentrations were 0.02M, 0.08M, and 0.14M; initial pH levels were 9.6, 10.0, and 10.4 (adjusted with aqueous ammonia). All combinations of these variables were tested and compared with a base-case leach at pH 10.0 which contained no peroxide. The leach conditions were 1M $(NH_4)_2CO_3$–0.5M $(NH_4)_2SO_4$; 5% solids, 80° C., three hours.

The results of Table I clearly show that cobalt extraction increased with increasing pH and hydrogen peroxide concentration. The effects of either variable are especially pronounced at low pH or lower peroxide concentration. Toward the higher range of both variables, cobalt extraction averages about 78% compared with 51% for the base case without peroxide.

Vanadium extraction was remarkably insensitive to the combination of variables tested. Still, the consistent 88% extraction was a considerable increase over the 78% observed in the base case. We attribute the increased vanadium and cobalt extraction to the formation of peroxo complexes.

Molybdenum and nickel extractions were not enhanced by peroxide addition. However nickel extraction did seem to decrease slightly with peroxide, but at higher pH values, extraction returned to base-case levels of about 80%. Molybdenum extraction was quite steady at about 93%.

TABLE I

EFFECT OF HYDROGEN PEROXIDE AND PH ON METALS EXTRACTED FROM SPENT CATALYSTS

| Test | Initial pH | Equilibrium pH | [H$_2$O$_2$] Molar | Metals Extraction, % | | | |
|---|---|---|---|---|---|---|---|
| | | | | Co | Mo | Ni | V |
| 1 | 10.00 | 9.75 | 0.00 | 51.3 | 91.8 | 81.1 | 78.3 |
| 2 | 9.60 | 9.42 | 0.02 | 60.6 | 92.5 | 70.5 | 88.1 |
| 3 | 9.60 | 9.44 | 0.08 | 66.6 | 92.3 | 67.4 | 86.6 |
| 4 | 9.60 | 9.47 | 0.14 | 80.2 | 94.3 | 76.2 | 90.6 |
| 5 | 10.00 | 9.70 | 0.02 | 69.3 | 92.7 | 76.9 | 88.0 |
| 6 | 10.00 | 9.77 | 0.08 | 78.2 | 93.6 | 76.4 | 89.4 |
| 7 | 10.00 | 9.73 | 0.08 | 75.9 | 93.4 | 76.2 | 87.6 |
| 8 | 10.00 | 9.78 | 0.14 | 75.9 | 93.4 | 72.4 | 88.1 |
| 9 | 10.40 | 9.97 | 0.02 | 72.6 | 93.0 | 82.5 | 88.2 |
| 10 | 10.40 | 9.78 | 0.08 | 81.6 | 93.6 | 80.8 | 88.5 |
| 11 | 10.40 | 9.81 | 0.14 | 78.8 | 93.6 | 79.8 | 88.4 |

While the present invention has been described with reference to specific embodiments, this application is intended to cover those changes and substitutions which may be made by those skilled in the art without departing from the spirit and scope of the appended claims.

What is claimed is:

1. A process to extract cobalt, molybdenum, nickel, and vanadium values from spent hydroprocessing catalyst particles containing carbon residue comprising:
   (a) roasting said spent catalyst in an oxygen-containing gas at a temperature of from 400° C. to 450° C.;
   (b) contacting said roasted catalyst particles with an aqueous solution of ammonia, ammonium salt, and hydrogen peroxide at a temperature of from 50° C. to 95° C.; wherein said aqueous solution has an initial pH of at least 10.4, an initial hydrogen peroxide concentration of from 0.02 to 0.2M, an initial ammonia concentration of at least 2M, and an initial ammonium salt concentration of at least 0.5M; and wherein said aqueous solution is maintained at a pH of greater than 9.5; and
   (c) repeating steps (a) and (b) to increase metals extraction.

* * * * *